No. 748,256. PATENTED DEC. 29, 1903.
E. M. BIRDSALL.
ELASTIC TIRE FOR VEHICLES.
APPLICATION FILED DEC. 9, 1901.
NO MODEL.
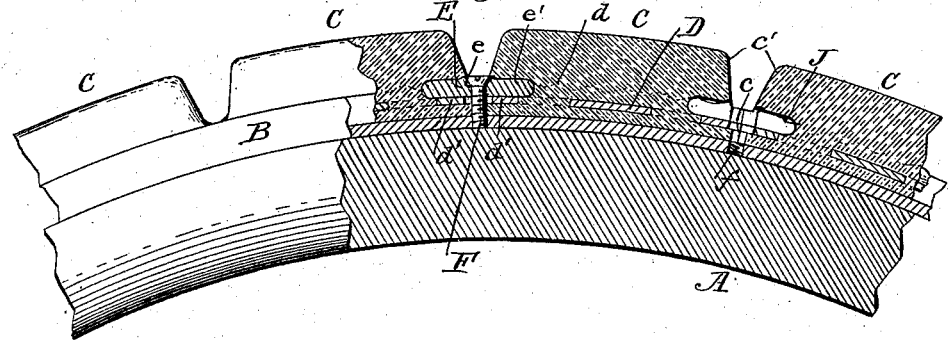
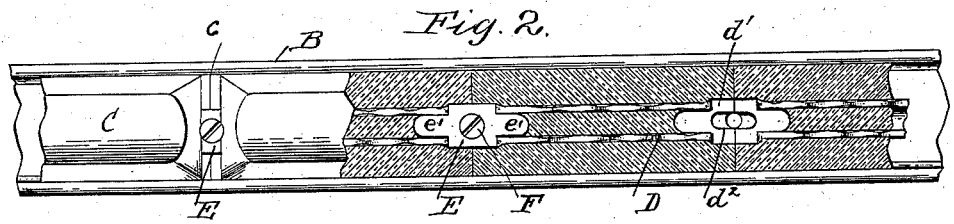
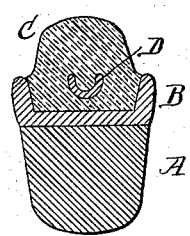
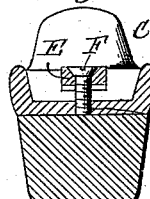
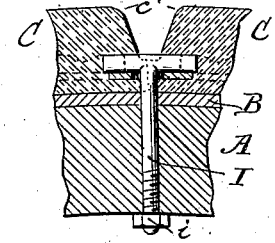
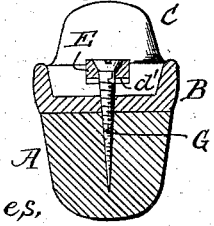
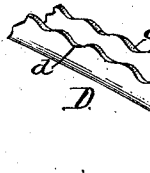
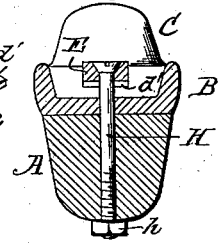
Witnesses,
F. F. Schwinger
E. A. Volk
E. M. Birdsall Inventor.
By Wilhelm Bonner
Attorneys.
THE NORRIS PETERS CO., PHOTO-LITHO., WASHINGTON, D. C.

No. 748,256. Patented December 29, 1903.

UNITED STATES PATENT OFFICE.

EDGAR M. BIRDSALL, OF BUFFALO, NEW YORK, ASSIGNOR TO DE WITT H. BOTHWELL, OF TOLEDO, OHIO.

ELASTIC TIRE FOR VEHICLES.

SPECIFICATION forming part of Letters Patent No. 748,256, dated December 29, 1903.

Application filed December 9, 1901. Serial No. 85,156. (No model.)

*To all whom it may concern:*

Be it known that I, EDGAR M. BIRDSALL, a citizen of the United States, residing at Buffalo, in the county of Erie and State of New York, have invented new and useful Improvements in Elastic Tires for Vehicles, of which the following is a specification.

This invention relates to improvements in solid-rubber tires for wheels, and has especial reference to that class of tires wherein a rubber tire is placed and secured in a channel or trough-shaped metal rim applied to an ordinary wheel. At the present time such rubber-tired wheels have come into quite general use, and it has developed in the use thereof where the rubber tire is continuous and is held in the metal rim by continuous tie rods or wires that in case of injury or damage to a part of the tire the same cannot be remedied or repaired in the ordinary repair shops or stables, but that the wheel must be shipped to the manufacturer at considerable cost and loss of time to the owner.

The main object of the present invention is to avoid this inconvenience, expense, and delay by providing a durable and desirable sectional rubber tire and fastenings or holdings therefor which can be applied to a trough-shaped or channel rim by the unskilled with ordinary tools, with little trouble, and at small expense.

A further object is to provide the rubber sections of the tire with retaining-bars which are embedded in and permanently secured to the rubber, so as to maintain the form of the sections and coöperate with the fastenings to prevent injury to the tire in use.

In the accompanying drawings, Figure 1 is an elevation, partly in section, of a portion of a wheel-felly equipped with a channel-rim and rubber tire embodying my invention. Fig. 2 is a plan view thereof, partly in section. Fig. 3 is a transverse sectional view through the felly, rim, and one of the tire-sections. Fig. 4 is a tranverse sectional view through the felly and rim, showing the fastening device and rubber tire-section in elevation. Fig. 5 is a perspective view of a part of one of the retaining-bars for the rubber tire-section. Fig. 6 is a transverse sectional elevation showing a slightly different securing-screw for the fastening devices. Fig. 7 is a similar view showing another form of securing-bolt. Fig. 8 is a fragmentary longitudinal section showing a slightly different form of fastening device.

Like letters of reference refer to like parts in the several figures.

A indicates a wheel-felly, a portion only of which is shown, and on the outer periphery of this felly is a metallic rim B, of trough or channel shape in cross-section, thus providing a circumferential retaining groove or channel for the rubber tire. These parts are not of my invention, and the precise configuration thereof is not essential, and they may be considered to represent a portion of an old wheel to which my improvements are applied.

C C represent tire-sections, usually made of rubber or other analogous yielding or elastic material. The tire-sections are similar and are arranged end to end in the channel of the rim. The lower portions of the tire-sections are made to conform to and fit snugly in the rim channel or groove, and the outer peripheral or tread portions of the sections are of any approved or desirable configuration. The ends of the sections at their inner portions meet on substantially radial lines, as indicated at $c$, and their outer end portions are beveled and rounded off at $c'$ to permit the more ready introduction of the fastening devices in the attachment of the sections and to permit the sections to expand longitudinally in use. Each tire-section has embedded therein in its inner part a retaining-bar D, which is preferably vulcanized into the rubber. The retaining-bar is trough or U shaped in cross-section, and the side flanges are preferably serrated or notched on their upper edges, as at $d$, to insure a better hold and prevent creeping in the rubber. The retaining-bar is thus very intimately and permanently connected with the rubber of the section and cannot work in the rubber and cut or injure the same. It also coöperates with the fastenings, as presently described, and prevents the tearing or breaking of the sections from the rim in use.

In the forms of the invention shown in Figs. 1 to 5 the bottoms of the retaining-bars at the opposite ends project beyond the ends of the side flanges to form bearing or engaging extensions $d'$ for the fastening devices. The bearing extensions are provided with notches $d^2$, which when two retaining-bars are placed end to end form a slot for the passage of a securing bolt or screw. The fastening devices employed each comprises a plate or block E, having a countersunk bolt-hole $e$ therein, and arms or studs $e'$, projecting from opposite sides of the plate E. One of these fastening devices is placed between the contiguous ends of each two retaining-bars, with its plate E resting on the bearing extensions $d'$ and its studs $e'$ extending between the side flanges of the retaining-bars. The retaining devices are held firmly in place to rigidly attach the tire-sections in the rim-channel by screws or bolts, as shown in the drawings. In Figs. 1, 2, and 4 short securing-screws F are shown, which are provided with heads resting in the countersunk holes in the fastening devices, and screw-threaded shanks, which pass through the slots formed in the adjacent bearing extensions of the retaining-bars and are screwed into screw-threaded holes $f$, provided therefor in the channel-rim.

In the form of the invention shown in Fig. 6 the same fastening devices are employed; but they are secured in place by ordinary wood-screws G, which pass through the slots in bearing extensions, registering holes in the channel-rim, and are screwed into the wood felly.

In the form of the invention illustrated in Fig. 7 the fastening devices are secured in the described relation by bolts H, which pass through the bearing extensions, rim, and felly and are provided with nuts $h$, screwed thereon on the inside of the felly.

The fastening device shown in Fig. 8 is slightly different from those heretofore described. It is in the form of a T-headed bolt I, the opposite arms of the head engaging between the end portions of the side flanges of the adjacent retaining-bars and resting on the ends of the bottoms thereof. The screw-threaded stem of the bolt passes through the rim and felly and is provided with a holding-nut $i$. In this form of the invention the ends of the side flanges of the retaining-bars extend somewhat beyond the ends of the bottoms thereof to provide openings or holes for the passage of the bolt-stems.

The ends of the rubber tire-sections are recessed at J to afford space for the fastening devices and permit the same to engage directly with the ends of the retaining-bars. As the arms of the fastening devices engage between the side flanges of the retaining-bars, they are thereby held from turning or working loose and cannot cut or damage the rubber sections.

By the described construction a wheel provided with the channeled rim can be readily equipped with the sectional tire in the first instance or to replace an old tire whether of the sectional or ordinary continuous form, and any particular worn or damaged section or sections can be quickly removed and replaced without disturbing the remainder of the tire.

I claim as my invention—

The combination with a channel-rim, of an elastic tire surrounding the same and composed of separate sections arranged end to end and having beveled ends provided with recesses to receive fastening devices, a separate trough-shaped metal retaining-bar embedded and vulcanized in each of said tire-sections and provided with portions interlocking with the material of the tire-section, and fastening devices arranged between the adjacent ends of said tire-sections, and having portions located in said recesses in the ends of the tire-sections and seated in the ends of said trough-shaped retaining-bars to hold the tire-sections on the rim, substantially as set forth.

Witness my hand this 4th day of December, 1901.

EDGAR M. BIRDSALL.

Witnesses:
JNO. J. BONNER,
C. M. BENTLEY.